Dec. 15, 1931.  F. R. JOHNSON  1,836,252
MAGNETIC SEPARATOR
Filed Oct. 20, 1928  3 Sheets-Sheet 2
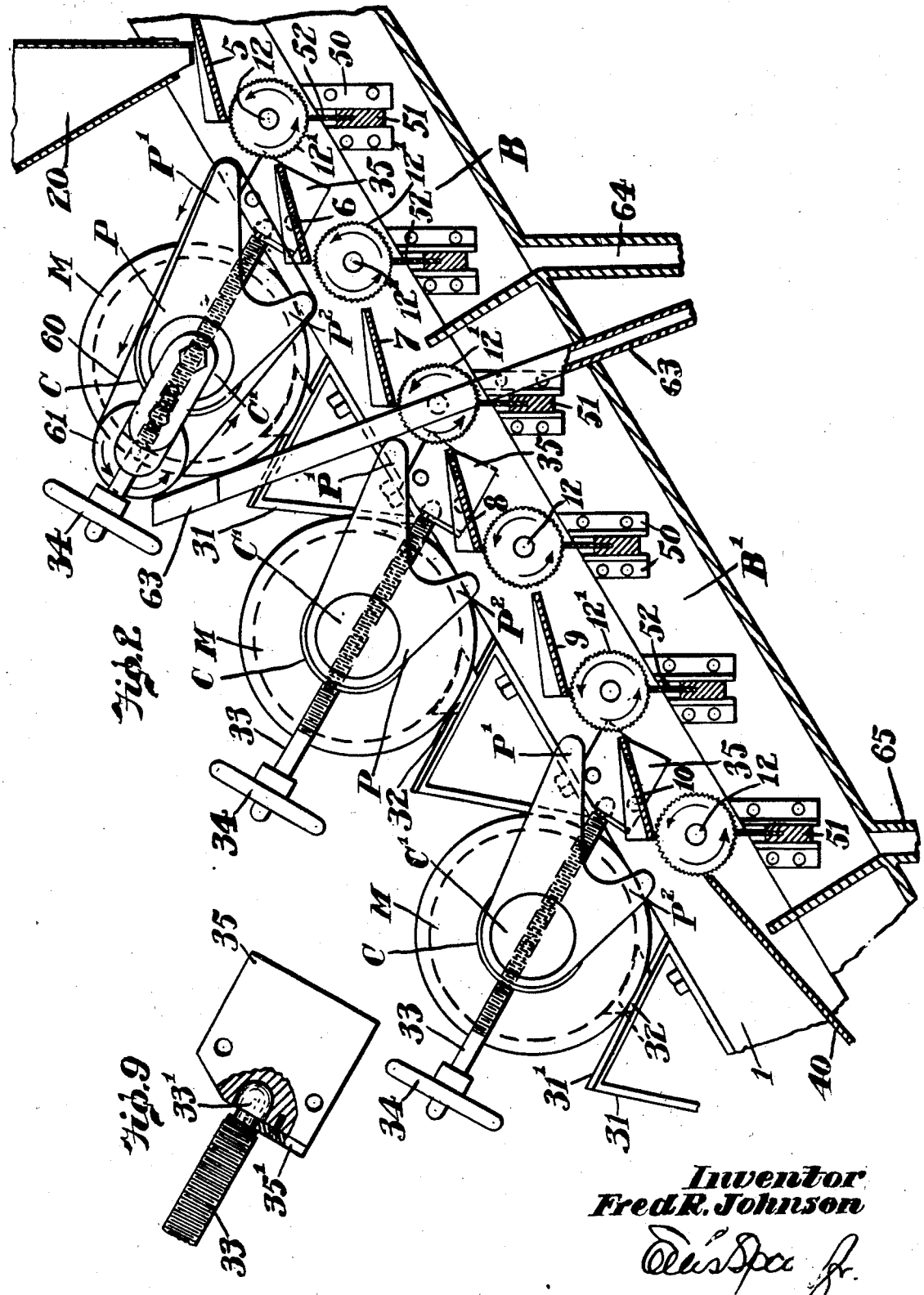
Inventor
Fred R. Johnson
By Attorney Dec. 15, 1931.  F. R. JOHNSON  1,836,252
MAGNETIC SEPARATOR
Filed Oct. 20, 1928  3 Sheets-Sheet 3
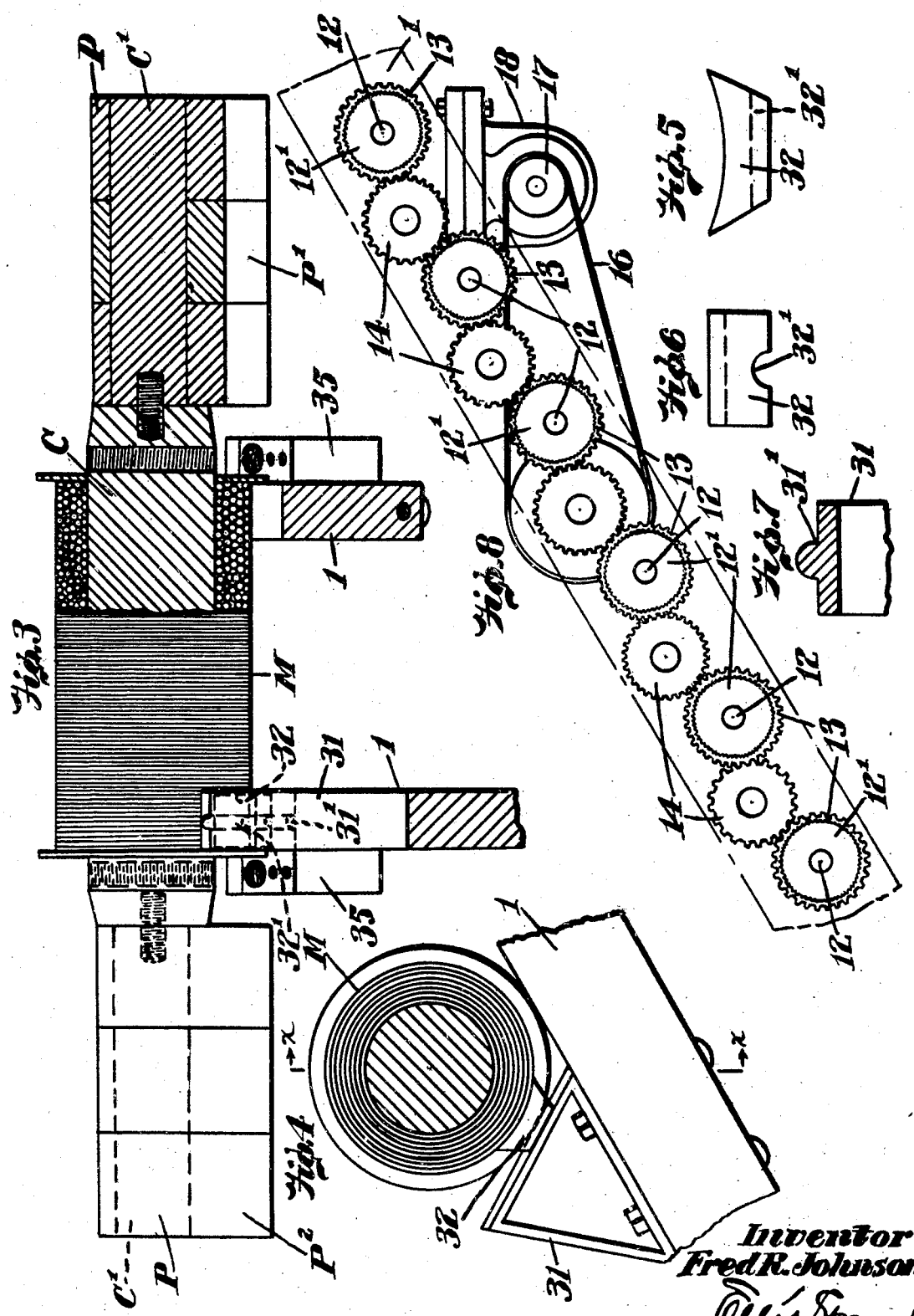
Inventor
Fred R. Johnson
By [signature]
Attorney Patented Dec. 15, 1931

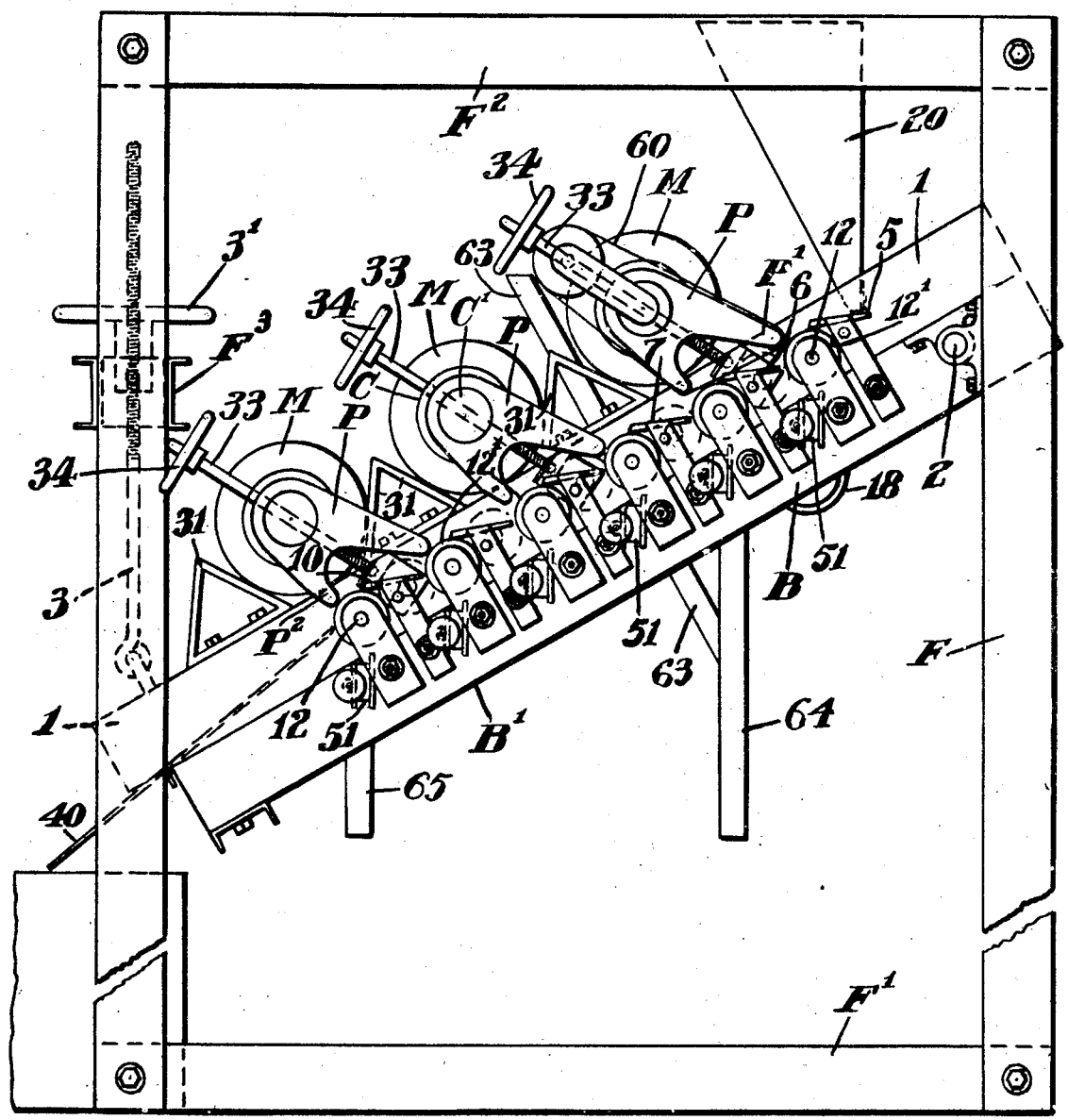

1,836,252

UNITED STATES PATENT OFFICE

FRED R. JOHNSON, OF HAMBURG, NEW YORK, ASSIGNOR TO THE EXOLON COMPANY, OF BLASDELL, NEW YORK, A CORPORATION OF MASSACHUSETTS

MAGNETIC SEPARATOR

Application filed October 20, 1928. Serial No. 313,917.

My present invention relates to certain improvements in magnetic separators for the separation and concentration of magnetic minerals and is a continuation in part of my previous application Serial No. 271,900, filed April 21, 1928. In said application I disclosed a separator for such use involving certain novel principles and these I have carried forward with certain new inventive concepts and improvements.

As illustrative of my invention I have shown a separator of the general type illustrated in my said prior application, but illustrating also the new principles and features which I will now describe. In the drawings:

Fig. 1 is a side elevation of the separator in accordance with my invention.

Fig. 2 an enlarged view partly sectioned through the separator fields.

Fig. 3 a view of one of the double magnets partly sectioned.

Fig. 4 a transverse section through the magnet armature.

Fig. 5 a side view of the sliding cradle for the magnet.

Fig. 6 is an end view of the same.

Fig. 7 a fragmentary section of the slideway on which the cradle moves.

Fig. 8 is an enlarged view of the rotor drive, and

Fig. 9 a detail of the magnet adjusting screw end.

Referring first to the general construction of my separator, I provide a framework consisting of uprights F, base pieces $F^1$, and upper cross pieces $F^2$. Between one pair of the uprights is a cross beam $F^3$ through which passes a hanger 3 having an upper threaded end on which is run an adjusting wheel $3^1$. This supports the free end of the supporting frame system which is pivoted at 2 to the uprights F so that the inclination of the separator chutes carried thereby may be adjusted as desired.

Centrally of the frame is a pair of spaced frame members 1 laterally of which are the side troughs of the frame. The frame members 1 carry a series of brackets 31 having on their inclined upper faces a centrally ribbed slideway $31^1$ on which rests a cradle 32 having a groove $32^1$ adapted to cooperate with the rib $31^1$ for holding the magnets M in proper position. The magnets are adjusted along this slideway by a screw 33 turned by a wheel 34 and rotating in a thrust block 35 in which its end is held by a plate $35^1$. The pole pieces for the magnets are preferably made up of a core C on which pole piece units P may be slipped and held by any suitable means as by a set screw.

Referring to Fig. 2 it will be seen that the pole pieces are double including the pole $P^1$ and $P^2$ by reason of which any single magnet M is able to influence the field of a pair of rotors on each side. These rotors indicated as $12^1$ are mounted on shafts 12 which extend across the longitudinal frame members being driven by gears 13 and intermediate gearing 14 so that the entire train may be driven as a whole from a belt 16 from the pulley 17 of the motor 18 which is hung conveniently from longitudinal frames.

Between the rotors $12^1$ short chutes extend in a series 5, 6, 7, 8, 9 and 10 from the hopper 20 to the final delivery chute 40. Beneath each rotor is a vertical slideway 50 in which is a slide 51 carrying a doctor blade 52 for clearing the adjacent rotor of any material not expelled in the ordinary reversal of flux.

My machine can be adjusted and operated to make separations as desired. If the magnets are set close to the rotors some highly magnetic material will be attracted and jump the gap.

In one feature of my invention I contemplate for certain uses a free running belt 60 which I have shown in Fig. 2 as mounted over the pole pieces of the upper magnets. As shown, this belt runs over a pulley 61 above the pole piece being drawn over the edges of the pole $P^1$ and $P^2$. This belt may be of any desired material, but preferably is made of canvas woven with transverse wire strips which have a tendency to not only clear the pole pieces, but to carry up the material and drop it into a chute 63.

The normally separated material from the rotors of the upper magnet are dropped into a chute 64. For most separation I may dispense with this chute and use a common receiving chamber or chute 65 into which everything falls except the uninfluenced material passing out over the end chute 40.

My machine as herein shown operates generally as in my prior application in that the magnetic forces on the particles as they slide down the chutes by gravity greatly increases the effects of the separation at the rotors on account of segregation in the chute caused by the concentration of the lines of force in the vicinity of the neutral line of the rotor.

Lines of force issue from the pole piece and pass, some through the rotor and some through the adjacent air without passing through the rotor, and those lines which enter the rotor on the side towards the pole piece must leave it on the other side; and this causes the appearance of a neutral line adjacent approximately to the termination of the chute along which neutral line the lines of force are neither entering nor leaving, but are tangential to the rotor surface. It is well known that when a magnetic cylinder is traversed by magnetic flux, these neutral lines must appear, and that there is a region on each side of each neutral line in which the convergence of lines of force is away from the neutral line. For example, see Fig. 78, page 225 and page 402 line 7 of J. H. Jeans' "The Mathematical Theory of Electricity and Magnetism", and Fig. 404, page 595, of Watson's "A Testbook of Physics". In the region through which the lower end of the chute passes, above this neutral line and to the right of it in Fig. 2, there is a convergence of magnetic lines of force in a general direction from left to right, and consequently magnetic particles, which tend to seek the greatest field strength, are urged to the right and this results in a retardation of the magnetic particles on this portion of the chute and a tendency towards segregation of them in the bottom of the chute on the lower side of the grain stream. This is important in that the efficiency of the ordinary magnetic separator is limited by the character of the material being treated; that is to say, whether or not the material is of a highly magnetic, feebly magnetic or diamagnetic character.

The operation of my separator is progressive by which material will be separated out according to its degree of magnetism. For example, it may be adjusted so as to take out highly magnetic material first and then by the adjustment of the poles take out the less and less magnetic particles.

The rotors $12^1$ may be of any desired type, preferably being thin discs which are so formed, as shown in Fig. 2, as to provide a multiplicity of local concentrations of lines of force at the surfaces of the rotors. By reason of these the magnetic material is diverted from its path in jumping from chute to chute and made to fall down or be carried down between the chutes and thus separated.

Thus the magnetic particles are attracted to or towards the rotor and removed from the main grain stream; and those which adhere to the rotor are released when they pass through the lower neutral line where the polarity of the rotor surface is reversed. This lower neutral line is approximately the same angular distance measured about the axis of the rotor, below the line joining the centre of the rotor with the pole piece as the upper neutral line previously refered to is above the said joining line.

The magnet core proper C is preferably provided with extensions $C^1$ on which the pole pieces are removably mounted. I provide these pieces P in units so that one or more may be slipped on as desired to get the proper width of field. By using the adjustably inclined chutes I am able to control the velocity of projection of the grain stream into the magnetic gap between each rotor and its pole piece. For the most sensitive and efficient separation, all particles having the same magnetic susceptibility should be projected into this gap at the same velocity, and if there is a difference in velocity between particles having different susceptibilities, the more susceptible should have the lower velocities. This is what happens in my machine, in which the more magnetic particles are selectively stratified in the lower part of the grain stream and selectively retarded, by the magnetic actions occurring in the chutes. Conditions favorable for efficient separation are thus pre-established. The method of feeding which I use is particularly advantageous in dealing with very fine materials, as for example, from 300 to 100 mesh. With such materials there is a serious dust problem in any machine which feeds by a vertical drop, due to air friction at high velocities of falling, or in a machine wherein the particles travel on an endless conveyor beneath magnets which must lift some of them out of a layer on the conveyor and drop them elsewhere. I am able to obtain an efficiency of separation not heretofore possible with these materials.

The application of the belt to one or more of the pole pieces is optional. It is highly desirable with certain materials carrying particles which tend to cluster on the pole pieces. The shape of the pole pieces and the number of rotors served may also be varied and the specific means for effecting the adjustment may be variously accomplished, all without departing from the spirit of my invention which I claim as follows:

1. In a magnetic separator, an inclined frame, a spaced series of pole pieces disposed across said frame, a spaced series of magnetized rotors journaled transversely of said frame beneath said pole pieces and spaced therefrom, a spaced series of grain feeders disposed between the several rotors to form therewith a means for feeding a grain stream continuously from the top towards the bottom of the separator, each feeder having a delivery near the topmost part of a rotor and adapted to project a grain stream over said rotor, said pole pieces and rotors cooperating to produce in the region of said grain feeders magnetic fields having each a component convergence in a direction opposed to the motion of the stream on a feeder and effective to retard the magnetic particles on said feeder and a component of convergence normal to the motion of said stream and effective to deflect the magnetic particles on said feeder into a stratum towards the bottom of the stream with the nonmagnetic particles disposed above the magnetic particles so as to be free to over-run the magnetic particles as the grain stream enters the gap between a pole piece and rotor.

2. In a magnetic separator, an open framework, an inclined support disposed diagonally of said framework, a spaced series of pole pieces disposed across said inclined support, a spaced series of magnetizable rotors journaled transversely of said inclined support beneath said pole pieces and spaced therefrom, an inclined sectional feed chute mounted on said inclined support with its several sections disposed between successive rotors, the lower end of each chute section being disposed near the topmost part of a rotor and adapted to project a grain stream over said rotor, said pole pieces and rotors cooperating to produce in the region of said chutes magnetic fields having components of convergence, respectively, counter to the direction of motion of said stream in said chutes and normal to said stream and downwardly and effective, respectively, both to retard the magnetic particles on said chutes and to deflect said retarded magnetic particles towards the bottom of said stream on said chutes.

3. In a magnetic separator, an inclined frame, two spaced series of pole pieces disposed across said inclined frame, two spaced series of magnetizable rotors journaled transversely beneath said pole pieces, each rotor and pole piece being coaxial with another rotor and pole piece at the other side of said frame, a core and winding connecting each pair of opposed pole pieces, two inclined sectional feed chutes mounted on opposite sides of said frame with their several sections disposed between successive rotors, the lower end of each chute section being disposed near the topmost part of a rotor and adapted to project a grain stream over said rotor, said pole pieces and rotors cooperating to produce in the region of said chutes magnetic fields having components of convergence, respectively, counter to the direction of motion of said stream on said chutes and normal to said stream and downwardly and effective, respectively, to retard the magnetic particles on said chutes and to deflect said retarded magnetic particles towards the bottom of said stream on said chutes.

4. A magnetic separator, comprising a stationary electro-magnet, a pole piece, a rotor magnetized only by induction by the pole piece and spaced from the pole piece, feed means for delivering a grain stream between said rotor and pole piece, the delivery of said feed means being at approximately the topmost part of the rotor whereby all of the particles in said stream are passed over the rotor, said magnet, pole piece and rotor being so shaped and so positioned relative to each other and to the feed means as of themselves solely to produce in the region of the delivery end of the feed means a magnetic field having components of gradient respectively parallel and normal to the direction of motion of the grain stream on said feed means and effective, respectively, to retard the magnetic particles on said feed means before they enter the gap between the rotor and pole piece, and to deflect the magnetic particles on said feed means before they enter the gap between the rotor and pole piece in a direction towards the bottom of the stream.

5. A magnetic separator, comprising a stationary electro-magnet, a pole piece, a rotor magnetized only by induction by the pole piece and spaced from the pole piece, an inclined feed chute for delivering a grain stream between said rotor and pole piece, the delivery of said feed chute being at approximately the topmost part of the rotor whereby all of the particles in said stream are passed over the rotor, said magnet, pole piece and rotor being so shaped and so positioned relative to each other and to the feed chute as of themselves solely to produce in the region of the delivery end of the feed chute a magnetic field having components of gradient respectively parallel and normal to the direction of motion of the grain stream on said feed chute and effective, respectively to retard the magnetic particles on said feed chute before they enter the gap between the rotor and pole piece, and to deflect the magnetic particles on said feed chute before they enter the gap between the rotor and pole piece in a direction towards the bottom of the streams.

6. A magnetic separator, comprising a stationary electro-magnet, a pole piece, a rotor magnetized solely by induction by the pole piece and spaced from the pole piece so as to form a magnetic circuit, feed means for delivering a grain stream between said rotor and pole piece; the delivery of said feed means being at approximately the topmost part of the rotor whereby all of the particles in said stream are passed over the rotor; said magnet, pole piece and rotor being so shaped and so positioned relative to each other and to the feed means as of themselves solely to produce in the region of the delivery end of the feed means a magnetic field and a neutral line of magnetization dividing surfaces of opposite polarity on the rotor near the uppermost part thereof, the delivery end of said feed means passing through the region adjacent to said neutral line and on the side of it away from said pole piece in which the magnetic field strength is increasing in a direction away from said pole piece; said field having components of gradient respectively parallel and normal to the direction of motion of the grain stream on said feed means effective, respectively, to retard the magnetic particles on said feed means before they enter the gap between the rotor and pole piece, and to deflect the magnetic particles on said feed means before they enter the gap between the rotor and pole piece towards the bottom of the stream.

7. A magnetic separator, comprising a stationary electro-magnet, a pole piece, a rotor magnetized solely by induction by the pole piece and spaced from the pole piece so as to form a magnetic circuit, an inclined feed chute for delivering a grain stream between said rotor and pole piece; the delivery of said feed chute being at approximately the topmost part of the rotor whereby all of the particles in said stream are passed over the rotor; said magnet, pole piece and rotor being so shaped and so positioned relative to each other and to the feed chute as of themselves solely to produce in the region of the delivery end of the feed chute a magnetic field, and a neutral line of magnetization dividing surfaces of opposite polarity on the rotor near the uppermost part thereof, the delivery end of said feed chute passing through the region adjacent to said neutral line and on the side of it away from said pole piece in which the magnetic field strength is increasing in a direction away from said pole piece; said field having components of gradient respectively parallel and normal to the direction of motion of the grain stream on said feed chute effective, respectively, to retard the magnetic particles on said feed chute before they enter the gap between the rotor and pole piece, and to deflect the magnetic particles on said feed chute before they enter the gap between the rotor and pole piece towards the bottom of the stream.

In testimony whereof I affix my signature.

FRED R. JOHNSON.